(12) United States Patent
Raghavan et al.

(10) Patent No.: US 11,546,036 B2
(45) Date of Patent: Jan. 3, 2023

(54) TECHNIQUES FOR BEAM TRAINING IN FULL DUPLEX WIRELESS COMMUNICATIONS

(71) Applicant: QUALCOMM Incorporated, San Diego, CA (US)

(72) Inventors: Vasanthan Raghavan, West Windsor Township, NJ (US); Andrzej Partyka, Bedminster, NJ (US); Junyi Li, Chester, NJ (US); Kapil Gulati, Belle Mead, NJ (US); Jung Ho Ryu, Fort Lee, NJ (US); Tianyang Bai, Somerville, NJ (US)

(73) Assignee: QUALCOMM Incorporated, San Diego, CA (US)

(*) Notice: Subject to any disclaimer, the term of this patent is extended or adjusted under 35 U.S.C. 154(b) by 47 days.

(21) Appl. No.: 17/076,397

(22) Filed: Oct. 21, 2020

(65) Prior Publication Data

US 2021/0135728 A1    May 6, 2021

Related U.S. Application Data

(60) Provisional application No. 62/931,020, filed on Nov. 5, 2019.

(51) Int. Cl.
| H04B 7/06 | (2006.01) |
| H04B 17/336 | (2015.01) |
| H04L 5/14 | (2006.01) |
| H04W 24/10 | (2009.01) |
| H04W 16/28 | (2009.01) |
| H04W 88/14 | (2009.01) |

(52) U.S. Cl.
CPC ......... *H04B 7/0632* (2013.01); *H04B 7/0617* (2013.01); *H04B 17/336* (2015.01); *H04L 5/14* (2013.01); *H04W 16/28* (2013.01); *H04W 24/10* (2013.01); *H04W 88/14* (2013.01)

(58) Field of Classification Search
None
See application file for complete search history.

(56) References Cited

U.S. PATENT DOCUMENTS

| 2018/0006686 A1* | 1/2018 | Kohli .................... H04B 1/1036 |
| 2018/0083679 A1* | 3/2018 | Lim ..................... H04B 17/336 |
| 2019/0140811 A1 | 5/2019 | Abedini et al. |
| 2019/0200337 A1* | 6/2019 | Zhou .................... H04B 7/0695 |
| 2021/0051660 A1* | 2/2021 | Askar ............... H04W 72/0453 |

OTHER PUBLICATIONS

International Search Report and Written Opinion—PCT/US2020/056834—ISA/EPO—dated Feb. 11, 2021.

* cited by examiner

*Primary Examiner* — Scott M Sciacca
(74) *Attorney, Agent, or Firm* — Arent Fox LLP/Qualcomm Incorporated (57) ABSTRACT

Aspects described herein relate to measuring a signal quality at at least one receive beam while transmitting, in full duplex communications, over each of one or more transmit beams associated with the at least one receive beam, and determining, based at least in part on the measured signal quality associated with each of the one or more transmit beams and the at least one receive beam, a transmit/receive beam pair to use in full duplex communications with one or more other nodes.

30 Claims, 5 Drawing Sheets

TECHNIQUES FOR BEAM TRAINING IN FULL DUPLEX WIRELESS COMMUNICATIONS

CLAIM OF PRIORITY UNDER 35 U.S.C. § 119

The present application for patent claims priority to Provisional Patent Application No. 62/931,020, entitled "TECHNIQUES FOR BEAM TRAINING IN FULL DUPLEX WIRELESS COMMUNICATIONS" filed Nov. 5, 2019, which is assigned to the assignee hereof and hereby expressly incorporated by reference herein for all purposes.

BACKGROUND

Aspects of the present disclosure relate generally to wireless communication systems, and more particularly, to determining beams to use in full duplex wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information.

In some wireless communication technologies, an access point and/or other nodes can be configured for full duplex (FD) communications where the access point or other node can concurrently transmit and receive over wireless communication resources within the same frequency band or the same component carrier. Access points can communicate with one another over one or more backhaul links; however, there can be clutter in a wireless communications path between two access points or other nodes, which can have an impact on signal-to-interference-plus-noise ratio (SINR) at one or more of the access points or other nodes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes measuring a signal quality at at least one receive beam while transmitting, in full duplex communications, over each of one or more transmit beams associated with the at least one receive beam, and determining, based at least in part on the measured signal quality associated with each of the one or more transmit beams and the at least one receive beam, a transmit/receive beam pair to use in full duplex communications with one or more other nodes.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

In an aspect, an apparatus for wireless communication is provided that includes a transceiver, a memory configured to store instructions, and one or more processors communicatively coupled with the transceiver and the memory. The one or more processors are configured to measure a signal quality at at least one receive beam while transmitting, in full duplex communications, over each of one or more transmit beams associated with the at least one receive beam, and determine, based at least in part on the measured signal quality associated with each of the one or more transmit beams and the at least one receive beam, a transmit/receive beam pair to use in full duplex communications with one or more other nodes.

In another aspect, an apparatus for wireless communication is provided that includes means for measuring a signal quality at at least one receive beam while transmitting, in full duplex communications, over each of one or more transmit beams associated with the at least one receive beam, and means for determining, based at least in part on the measured signal quality associated with each of the one or more transmit beams and the at least one receive beam, a transmit/receive beam pair to use in full duplex communications with one or more other nodes.

In another aspect, a computer-readable medium including code executable by one or more processors for wireless communication is provided. The code includes code for measuring a signal quality at at least one receive beam while transmitting, in full duplex communications, over each of one or more transmit beams associated with the at least one receive beam, and determining, based at least in part on the measured signal quality associated with each of the one or more transmit beams and the at least one receive beam, a transmit/receive beam pair to use in full duplex communications with one or more other nodes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to determining beams to use in transmitting and/or receiving full duplex (FD) wireless communications. For example, a node can determine pairs of transmit/receive beams that are desirable (or are undesirable), or pairs of transmit/receive beams that are to be avoided or not to be avoided, in a wireless communication environment, and can determine beams to use based on the determined pairs. In an example, FD communications at a node can be impacted by clutter caused by objects interfering with wireless signals. For example, an object can cause a transmitted signal to be reflected back to an access point, and in FD communications, the reflected signal can be received and can interfere with other received wireless communications. In this regard, for example, transmit/receive beam pairs that have excessive noise from clutter can be determined and avoided in determining transmit/receive beam pairs to use for wireless communications. Similarly, in an example, transmit/receive beam pairs that have desirable properties (e.g., beam pairs determined to have low noise levels and/or determined as not to be avoided) can be determined and used for wireless communications.

FD communications, as referred to herein, can include a single node (e.g., an access point) transmitting and receiving (e.g., concurrently) over communication resources in the same frequency band and/or over communication resources in the same component carrier (CC). In one example, FD communications can include in-band full duplex (IBFD) where the single node can transmit and receive on the same time and frequency resource, and the downlink and uplink can share the same IBFD time/frequency resources (e.g., full and/or partial overlap). In another example, FD communications can include sub-band FD (also referred to as "flexible duplex") where the single node can transmit and receive at the same time but on different frequency resources within the same frequency band (or over communication resources in the same CC), where the downlink resource and the uplink resources can be separated in the frequency domain (e.g., by a guard band). For example, the guard band in sub-band FD can be on the order of resource block (RB) widths (e.g., 180 kilohertz (kHz) for third generation partnership project (3GPP) long term evolution (LTE) and fifth generation (5G) new radio (NR), 60 and 120 kHz for NR, etc.). This can be distinguished from a guard band in frequency division duplexing (FDD) communications defined in LTE and NR, which can be 5 megahertz (MHz) or more, and the associated resources in FDD are defined between frequency bands, but not within the same frequency band (or resources in the same CC) as is the case in sub-band FD communications.

FD systems can have increased rate and spectral efficiency over half-duplex systems as simultaneous transmit/receive are possible. In addition, enhanced self-interference (and thus decreased signal-to-interference-plus-noise ratio (SINR)) from the transmit part of the system on the receive part of the system is possible due to impact of clutter, as described herein. For example, clutter may include any object that can act as a reflector, diffractor, scatterer, etc. that redirects signal energy in a different (e.g., unintended) direction, such objects including stationary objects, such as a building, tree, etc., moving objects, such as a car, etc., and/or the like. Thus, in an example, clutter can be static or dynamic and the associated object may be mobile (e.g., moving) or time-varying in terms of induced gains. Clutter around an IAB node can be dense or sparse and can be dependent on local geometry and/or channel environment. In some examples of FD communications, various antenna configurations can be used within a device (e.g., an access point) to facilitate FD communications. In one configuration, a transmit antenna array can be spatially separated or isolated from a receive antenna array within the device to reduce leakage (e.g., self-interference) from the transmit antenna array into the receive antenna array. The circuitry used to achieve this isolation may be more amenable for backhaul or customer premises equipment (CPE)-type applications. In another example, the antenna array configuration of non-FD communications can use the same antenna array(s) for transmitting or receiving (but not both).

Aspects described herein relate to mitigating impact of clutter on SINR reduction, which can be based at least in part on determining desirable beams for transmitting and/or receiving wireless communications at a node. For example, determining the desirable beams can be based on determining beams to not be avoided based on associated signal properties, or determining beams that are not in a list of beams to be avoided based on the associated signal properties. In one example, beam training can be performed among various nodes to determine to use transmit/receive beam pairs not to be avoided for communicating among the various nodes. As part of beam training, in one example, a node can determine whether one or more beam pairs exhibit undesirable interference caused from clutter, and may accordingly at least try to avoid using these beam pair(s), which can mitigate SINR reduction at the node. For example, where the one or more beam pairs to be avoided are determined, an access node can attempt to use a different more desirable beam pair. In one example, where the one or more beam pairs are configured for the access node, the access node can replace at least one of the beams with a nullforming beam to steer energy in a desired direction and away from self-interference. In another example, where the one or more beam pairs to be avoided are determined or configured for the access node, the access node can indicate the beam pair(s) to be avoided to one or more other nodes in an attempt to avoid assignment of the one or more beam pairs (or can indicate beam pair(s) not to be avoided in an attempt to receive a desired beam pair assignment). In yet another example, where the one or more beam pairs to be avoided are determined or configured for the access node, the access node can request a different beam pair.

In any case, beams that cause excessive self-interference caused by clutter can be determined and/or avoided to improve quality/efficiency of backhaul communications or other communications between other nodes. Nodes, as referred to herein, can include substantially any type of node capable of FD wireless communications, which may include any class of device defined in third generation partnership project (3GPP), such as a UE, a IAB node, CPE, base station or other access point, relay node, repeater (e.g., smart or dumb repeater), etc., which can communicate over an access link, sidelink, etc., as described further herein.

The described features will be presented in more detail below with reference to FIGS. 1-5.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronic Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Figure 1:
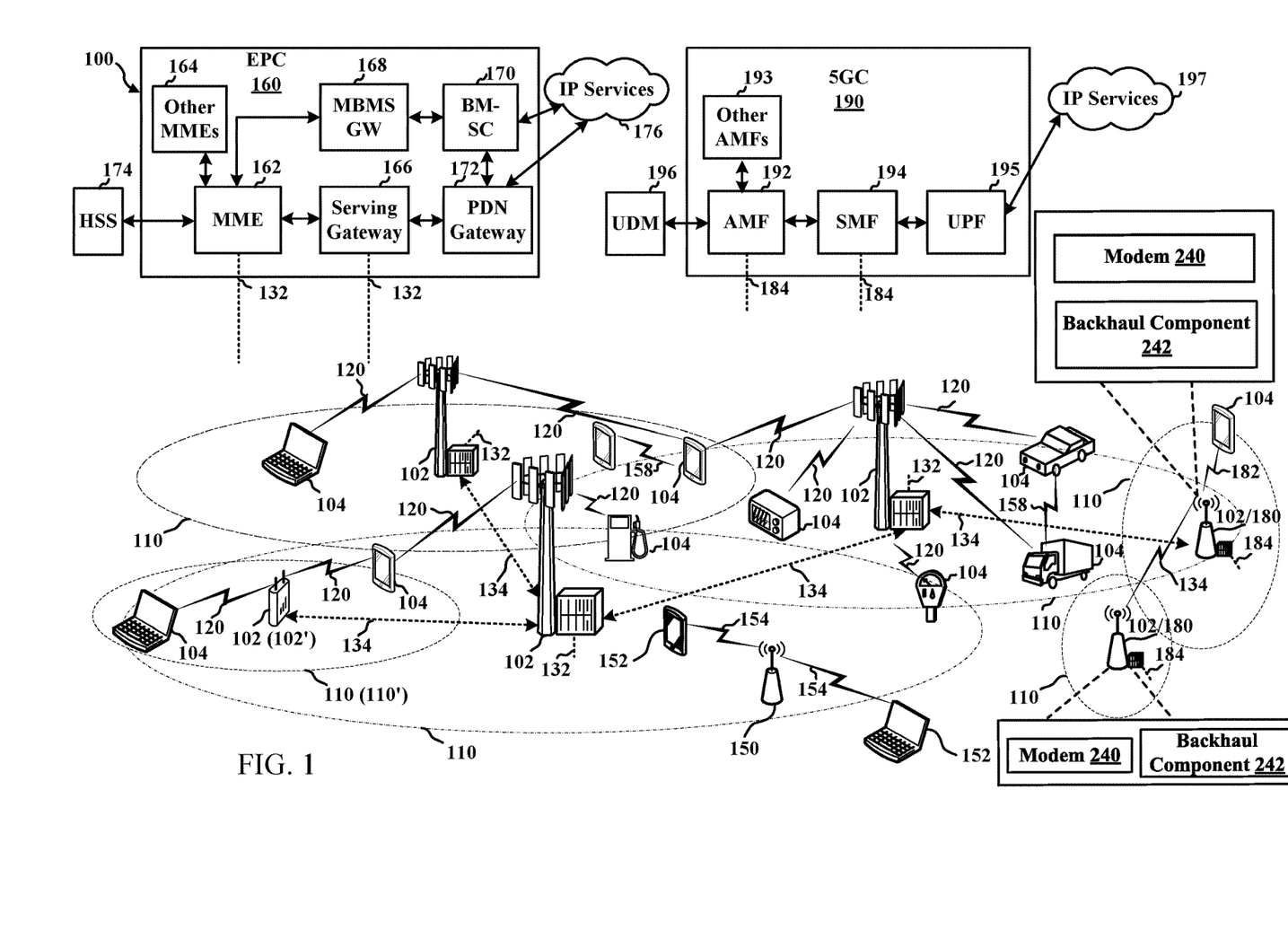
FIG. 1 illustrates an example of a wireless communication system, in accordance with various aspects of the present disclosure.

FIG. 1 is a diagram illustrating an example of a wireless communications system and an access network 100. The wireless communications system (also referred to as a wireless wide area network (WWAN)) can include base stations 102, user equipments (UEs) 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and backhaul component 242 for communicating with one another over a wireless or wired backhaul link 134, as described herein. Though a base station 102 is shown as having the modem 240 and backhaul component 242, this is one illustrative example, and substantially any node or type of node may include a modem 240 and backhaul component for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RI), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communication (MTC)/enhanced MTC (eMTC, also referred to as category (CAT)-M or Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, backhaul component 242 can be configured to perform backhaul communications with one or more base stations 102/gNBs 180 using FD. In an example, backhaul component 242 can determine one or more beams to use for the backhaul communications, which can include one or more transmit/receive beam pairs per backhaul connection 134. In an example, a base station 102/gNB 180 can communicate with multiple other base stations 102/gNBs 180 over different backhaul connections 134, and can accordingly determine a transmit/receive beam pair for each backhaul connection 134. For example, a base station 102/gNB 180 can perform beam training with one or more other base stations 102/gNBs 180, or self-training, to determine one or more beams (or one or more transmit/receive beam pairs) that should be avoided or that are desirable, and can determine beams to use based on the determining the beam(s) that should be avoided or that are desirable, as described further herein.

Figure 2:
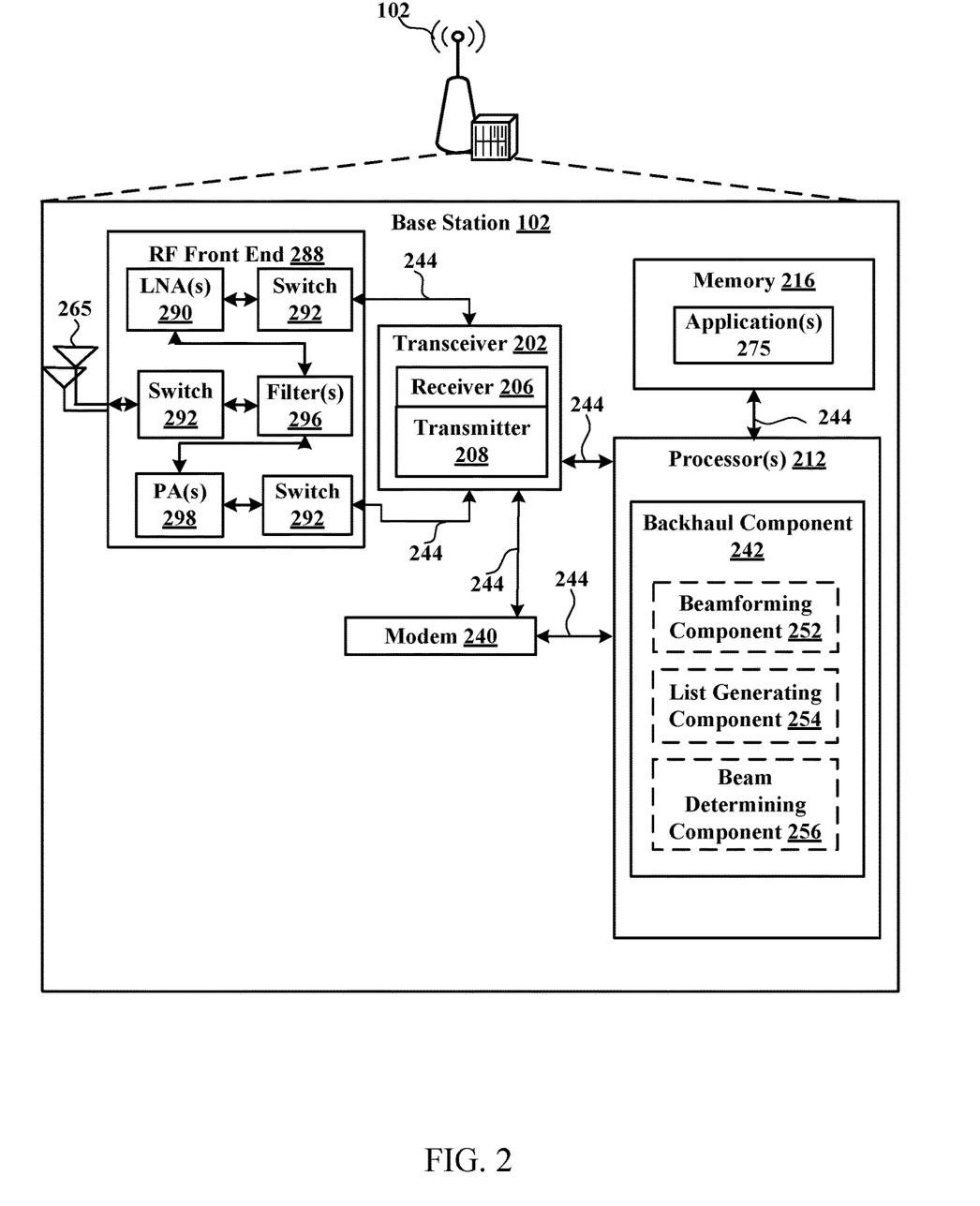
FIG. 2 is a block diagram illustrating an example of a base station, in accordance with various aspects of the present disclosure.
Figure 3:
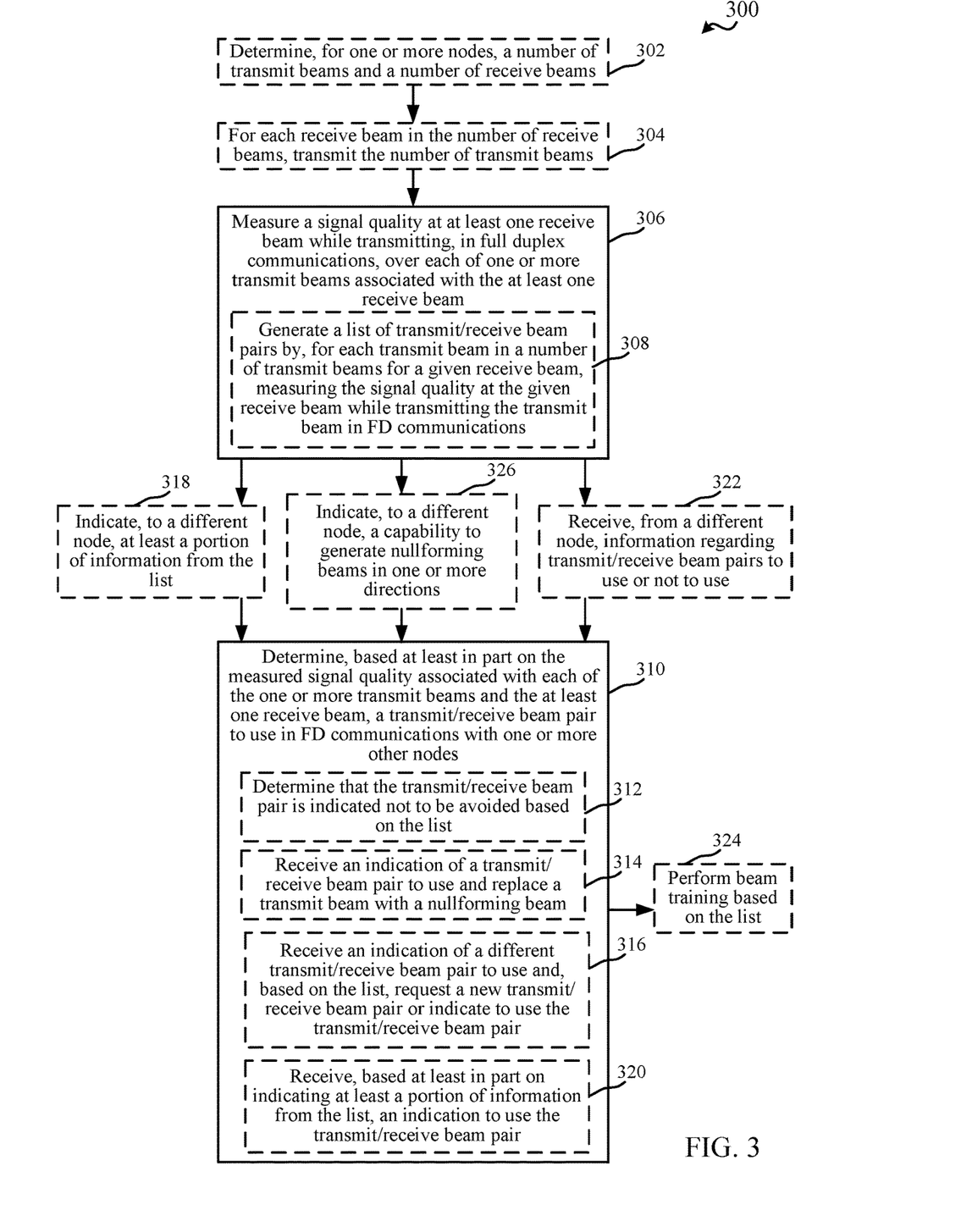
FIG. 3 is a flow chart illustrating an example of a method for determining transmit/receive beam pairs, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIG. 3 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially-programmed software or computer-readable media, or by any other combination of a hardware component and/or a software component capable of performing the described actions or functions.

Referring to FIG. 2, one example of an implementation of a base station 102 (and/or gNB 180) may include a variety of components, some of which have already been described above and are described further herein, including components such as one or more processors 212 and memory 216 and transceiver 202 in communication via one or more buses 244, which may operate in conjunction with modem 240 and/or backhaul component 242 for communicating with other base stations 102/gNBs 180 over a backhaul connection 134, determining beams for FD backhaul communications, etc., as described herein.

In an aspect, the one or more processors 212 can include a modem 240 and/or can be part of the modem 240 that uses one or more modem processors. Thus, the various functions related to backhaul component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with backhaul component 242 may be performed by transceiver 202.

Also, memory 216 may be configured to store data used herein and/or local versions of applications 275 or backhaul component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining backhaul component 242 and/or one or more of its subcomponents, and/or data associated therewith, when base station 102 is operating at least one processor 212 to execute backhaul component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by another base station or wireless transmissions transmitted by base station 102. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that base station 102 can communicate with, for example, one or more other base stations over a backhaul connection (and/or with one or more UEs). In an aspect, for example, modem 240 can configure transceiver 202 to operate at a specified frequency and power level based on the configuration of the base station 102 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of base station 102 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on configuration information associated with base station 102 as provided by the network or other components.

In an aspect, backhaul component 242 can optionally include a beamforming component 252 for generating transmit beams for transmitting communications over a backhaul connection and/or generating receive beams for receiving communications over the backhaul connection, a list generating component 254 for generating a list of transmit/receive beam pairs, which can include beam pairs to be avoided in FD backhaul communications or beam pairs to allow for FD backhaul communications, and/or a beam determining component 256 for determining a transmit beam, receive beam, and/or transmit/receive beam pair to use for FD communications over a backhaul connection, as described herein.

In an aspect, the processor(s) 212 may correspond to one or more of the processors described in connection with the base station(s) in FIG. 5. Similarly, the memory 216 may correspond to the memory described in connection with the base station(s) in FIG. 5.

FIG. 3 illustrates a flow chart of an example of a method 300 for determining a transmit and/or receive beam to use for FD backhaul communications with another node. In an example, a base station 102 can perform the functions described in method 300 using one or more of the components described in FIGS. 1 and 2.

In method 300, optionally at Block 302, a number of transmit beams and a number of receive beams can be determined for one or more nodes. In an aspect, beamforming component 252, e.g., in conjunction with processor(s) 212, memory 216, transceiver 202, backhaul component 242, etc., can determine, for the one or more nodes, the number of transmit beams and the number of receive beams. For example, the number of transmit beams and the number of receive beams can include beams for the base station 102, for self-training and/or beam determination. In another example, the number of transmit beams and the number of receive beams may additionally or alternatively include beams for other nodes with which the base station 102 can communicate over a backhaul connection 134. For example, the number of transmit beams and number of received beams can be determined from a configuration received or otherwise stored in the base station 102. In an example, the base station 102 and/or other nodes can be capable of beamforming communications resources to aim energy used to transmit or receive signals in certain directions.

In method 300, optionally at Block 304, for each receive beam in the number of receive beams, the number of transmit beams can be transmitted. In an aspect, beamforming component 252, e.g., in conjunction with processor(s) 212, memory 216, transceiver 202, backhaul component 242, etc., can, for each receive beam in the number of receive beams, transmit the number of transmit beams. For example, for a number of nodes that are capable of FD backhaul communications (referred to as "FD nodes" or "nodes" herein) in the network, let the transmit part of each FD node use N beams and let the receive part of each FD node use M beams. In this example, beamforming component 252 can perform a beam training operation from each transmit part sequentially while all receive parts (including the receive part of the base station 102 transmitting and other nodes) receive the beams. In one example, this process can be performed by the base station 102 in performing self-training for the beams and/or can be repeated by transmit parts for each FD node until all FD nodes have transmitted beams, which were received by all receive parts of the other FD nodes (and/or the receive parts of the transmitting FD node itself) as part of a full beam training performed by/for multiple nodes.

In method 300, at Block 306, a signal quality at at least one receive beam can be measured while transmitting, in full duplex communications, over each of one or more transmit beams associated with the receive beam. In an aspect, backhaul component 242, e.g., in conjunction with processor (s) 212, memory 216, transceiver 202, etc., can measure a signal quality at at least one receive beam while transmitting, in full duplex communications, over each of one or more transmit beams associated with the receive beam. For example, this can include measuring, at at least one of the M receive beams, the N transmitted beams as received, and/or measuring, at all of the M receive beams, each of the N transmitted beams as received, as described above and further herein. The measured signal quality can be an indicator of whether to avoid using, or not to avoid using, a given transmit/receive beam pair in backhaul communications with another node.

In measuring the signal quality at Block 306, optionally at Block 308, a list of transmit/receive beam pairs can be generated by, for each transmit beam in a number of transmit beams for a given receive beam, measuring the signal quality at the given receive beam while transmitting the transmit beam in FD communications. In an aspect, list generating component 254, e.g., in conjunction with processor(s) 212, memory 216, transceiver 202, backhaul component 242, etc., can generate a list of transmit/receive beam pairs by, for each transmit beam for a given receive beam, measuring the signal quality at the given receive beam while transmitting the transmit beam in FD communications. For example, certain pairs of transmit/receive beams may result in interference at the base station 102 due to clutter. For example, clutter can include objects in the path of a signal that can cause the signal to reflect, be blocked, or otherwise exhibit undesirable behaviors. The possibly negative effects can be measured by receiving the signals at the base station 102 and determine whether clutter causes the transmit beam clutter to result in excessive energy (e.g., energy measured to be at least at a threshold energy level) received using a certain receive beam. If so, list generating component 254 can add these beam pairs to the list as beam pairs to be avoided, and the beam pairs may be avoided, as described further herein. In other examples, the list can include beam pairs that exhibit interference, which may include self-interference, below a threshold (and thus are not to be avoided), and these beam pairs can be added to the list and attempted to be used, as described further herein.

Figure 4:
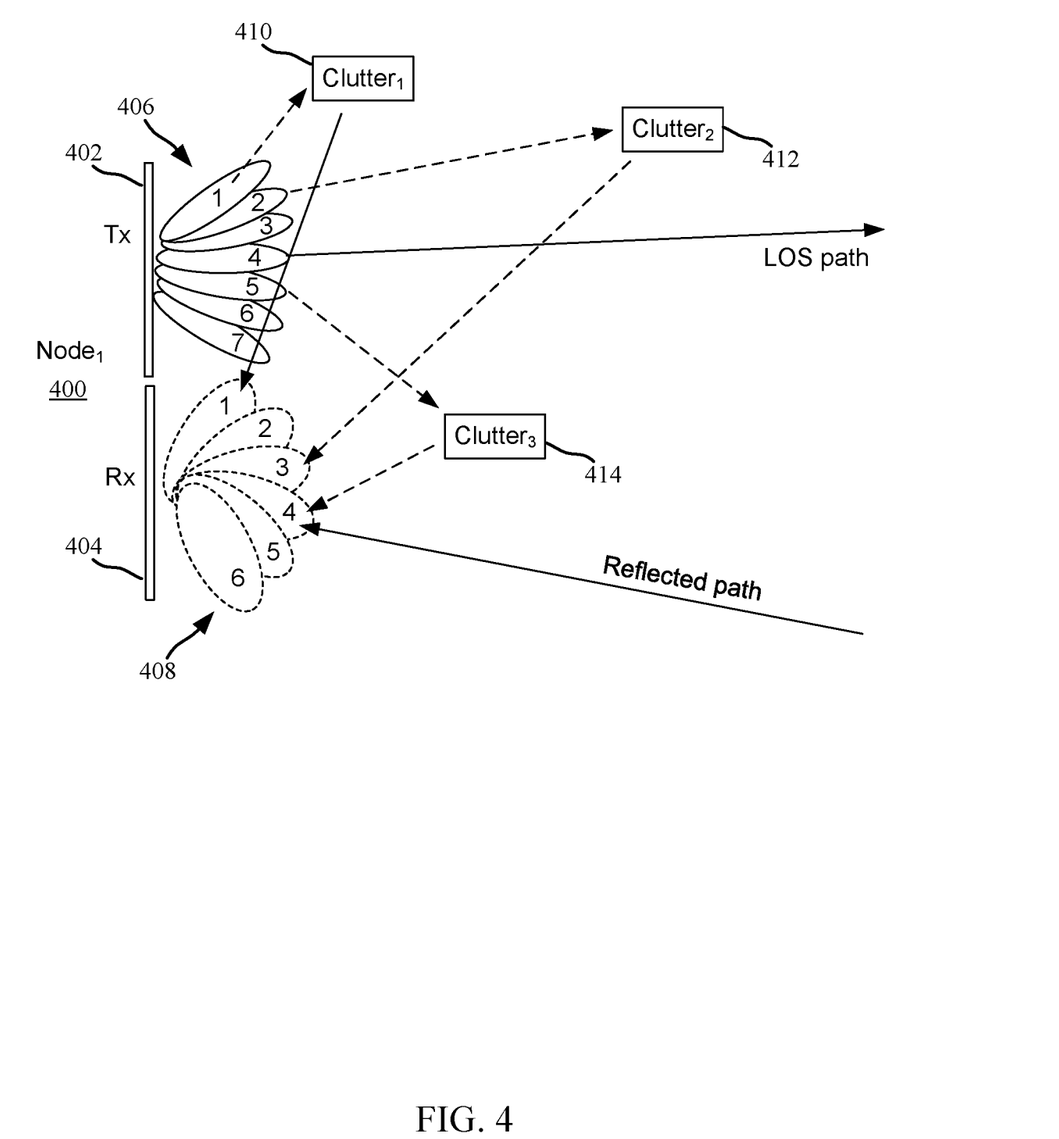
FIG. 4 illustrates an example of a node for determining transmit/receive beams in the presence of clutter, in accordance with various aspects of the present disclosure.

For example, list generating component 254 can generate the list to include a measurement of interference experienced with the beam pair (e.g., SINR at the receive beam, measured in decibel), a classification of interference (e.g., low or high), an indication to avoid the beam pair (or presence in the list may indicate to avoid the beam pair), etc. In this regard, for example, beam determining component 256 can determine beam pairs to avoid (or to use), as described further herein. An example of a list with reference to FIG. 4, described below) may be the following:

| Beam Pair Index | Interference at Rx part of node |
|---|---|
| Beam 1 at Tx part, Beam 1 at Rx part | High |
| Beam 2 at Tx part, Beam 3 at Rx part | High |
| Beam 5 at Tx part, Beam 4 at Rx part | High |
| ... | ... |
| Some beam pair | Low |
| Some beam pair | Low |

In this example, the beam pairs indicated as exhibiting low interference can be used or attempted to be used in communicating with a given node.

FIG. 4 illustrates an example of a node transmitting and receiving with clutter. In FIG. 4, a node 400 has a transmit chain 402 and a receive chain 404. Transmit chain 402 can beamform in various directions to create transmit beams 406, numbered 1-7. Receive chain 404 can beamform in various directions to create receive beams 408, numbered 1-6. Each transmit beam can have an associated line-of-sight (LOS) path, shown for transmit beam 4, and a reflected path for a received beam, shown for receive beam 4. As described, node 400 can transmit each of the transmit beams 406 for each receive beam 408 in beam training. Due to clutter, such as clutter 1 410, clutter 2 412, clutter 3 414, some transmit beams may become part of the reflected path for a receive beam. Clutter can include substantially any object in a LOS path that redirects signal energy of a transmit beam, as described, such as a building or structure (e.g., another base station), a car, a tree, etc. In FIG. 4, clutter 1410 can cause transmit beam 1 to interfere with, or be reflected to, receive beam 1; clutter 2 412 can cause transmit beam 2 to interfere with, or be reflected to, receive beam 3; and clutter 3 414 can cause transmit beam 5 to interfere with, or be reflected to, receive beam 4. The interference can be detected by measuring signal energy, quality, or interference (e.g., SINR, SNR, etc.) at the receive beam, as described herein, where the signal energy, quality, or interference can include a measure of self-interference caused by a corresponding transmit beam of the one or more transmit beams at the at least one receive beam. The measure of self-interference can correspond to the measured signal energy, quality, or interference as a metric that can be measured (e.g., against a threshold) to determine whether the self-interference is prohibitive for using the beam pair for communications. The signal energy or measure of interference may reflect the amount of self-interference caused at the receive beam. Beam pairs determined to be undesirable (e.g., exhibiting signal energy over a threshold, and thus are to be avoided) can be added to the list to be avoided for FD communications (or the other beam pairs not to be avoided can be added to the list depending on the list functionality), which is shown in the example of the list above, showing a first beam pair of Beam 1 at Tx part, Beam 1 at Rx part, a second beam pair of Beam 2 at Tx part, Beam 3 at Rx part, and a third beam pair of Beam 5 at Tx part, Beam 4 at Rx part, as having high Rx interference.

In another example, each FD node can determine the relative interference level (in decibel (dB)) seen at the receiver part due to transmitter part transmissions for each beam pair. When a different FD node performs beam training, the node 400 can also determine the beam indices to use to receive the different FD node's signal, which can be performed independently of the beam training described above. For example, the node 400 can include another list of beam pairs to use to establish links with other nodes, where these beam pairs can be determined during beam training. For example, this list may include the following:

| FD node with which to establish a link | Beam pair to use at node 400 |
|---|---|
| Node 400 ←→ Node 3 | Beam 6 at Tx part, Beam 2 at Rx part |
| Node 400 ←→ Node 7 | Beam 4 at Tx part, Beam 1 at Rx part |
| ... | ... |
| Node 400 ←→ Node 2 | Beam 5 at Tx part, Beam 4 at Rx part |

A determined or selected beam pair to use with another node, however, may conflict with the list of beam pairs to be avoided (e.g., beam 5 at Tx part, beam 4 at Rx part for communicating with Node 2). As described, FIG. 4 shows a codebook of beams with N=7 beams for transmitter (Tx) part and M=6 beams for receiver (Rx) part. In this example of FIG. 4, high interference on receiver part of node 400 is exhibited due to transmissions from transmit part of node 400 with the following beam pairs: Beam 1 at Tx part, Beam 1 at Rx part corresponding to Clutter 1 410, Beam 2 at Tx part, Beam 3 at Rx part corresponding to Clutter 2 412, Beam 5 at Tx part, Beam 4 at Rx part corresponding to Clutter 3 414. If node 400 uses Beam index 4 as a Rx beam for receiving communications from a different node, and uses Beam index 5 as a TX beam to transmit communications to the different node, high interference cannot be avoided at the Rx part of node 400.

Referring back to FIG. 3, in method 300, at Block 310, a transmit/receive beam pair to use in FD communications with one or more other nodes can be determined based at least in part on the measured signal quality associated with each of the one or more transmit beams and the at least one receive beam. In an aspect, beam determining component 256, e.g., in conjunction with processor(s) 212, memory 216, transceiver 202, backhaul component 242, etc., can determine, based at least in part on the measured signal quality associated with each of the one or more transmit beams and the at least one receive beam, a transmit/receive beam pair to use in FD communications with one or more other nodes. In one example, beam determining component 256 can determine the transmit/receive beam pair based at least in part on the list generated at Block 308, as described further herein. For example, beam determining component 256 can determine a beam pair to use for transmitting communications to and receiving communications from a given node, but may avoid beam pairs determined to have a signal quality below a threshold (e.g., beam pairs indicated in the list where the list includes undesirable beam pairs to be avoided for self-interference). In another example, beam determining component 256 can determine a beam pair to use for transmitting communications to and receiving communications from a given node by selecting a beam pair determined to have a signal quality that achieves a threshold (e.g., a beam pair indicated in the list where the list includes desirable beam pairs not to be avoided). In an example, beam determining component 256 can determine a beam pair to use, request a beam pair from another node, request a new beam pair where a beam pair to be avoided is assigned by another node, use nullforming for the transmit beam where a beam pair to be avoided is assigned by another node, etc., as described herein.

In one example, in determining the transmit/receive beam pair at Block 310, optionally at Block 312, it can be determined that the transmit/receive beam pair is indicated as not to be avoided based on the list. In an aspect, beam determining component 256, e.g., in conjunction with processor(s) 212, memory 216, transceiver 202, backhaul component 242, etc., can determine that the transmit/receive beam pair is indicated as not to be avoided (or allowed or otherwise desirable) based on the list. For example, beam determining component 256 can determine that the transmit/receive beam pair is in the list where the list includes allowed beam pairs (e.g., and does not include beam pairs that are not allowed), can determine the transmit/receive beam pair is not in the list where the list includes not allowed beam pairs (or beam pairs to be avoided, and does not include beam pairs that are allowed), can determine that the beam pair is associated with low interference (e.g., high SINR) as indicated in the list, can determine that the beam pair is not associated with high interference (e.g., low SINR) as indicated in the list, etc. as described.

In another example, in determining the transmit/receive beam pair at Block 310, optionally at Block 314, an indication of a transmit/receive beam pair to use can be received, and a transmit beam can be replaced with a nullforming beam. In an aspect, beam determining component 256, e.g., in conjunction with processor(s) 212, memory 216, transceiver 202, backhaul component 242, etc., can receive the indication of the transmit/receive beam pair to use and can replace the transmit beam with the nullforming beam. For example, beam determining component 256 can receive an indication as a configured transmit/receive beam pair that is configured for use by another node (e.g., a node with which to perform FD communications). For instance, the other node can determine a desirable beam pair based on performing beam training, and can indicate the transmit/receive beam pair as the configured transmit/receiving beam pair that is to be used based on the beam training, based on signals received from the base station 102, a known location of the base station 102, and/or the like. In this example, beam determining component 256 may determine that the transmit/receive beam pair indicated by the other node is present in the list of pairs to be avoided (or not present in the list of pairs to be used, or otherwise has high associated interference). In this case, for example, beam determining component 256 can determine to replace the transmit beam in the indicated transmit/receive beam pair with a nullforming beam that can null energy in the direction of the receive beam. For example, this can be an autonomous approach to mitigate the interference from clutter where the indicated beam from the other node is replaced with a nullforming beam that steers energy in the indicated direction and null in the direction of self-interfering direction at the base station 102. For example, if the different node (e.g., Node 2 in the examples above) requests Beam 5 for Tx at the base station 102 (e.g., node 400 in the examples above), the base station (e.g., node 400) can decline this beam index or replace Beam 5 at the transmit part with a nullforming beam that steers energy in the direction of Beam 5 for transmission and null in the direction of Beam 4 for the receive part. This may cause the other node to use a different beam other than Beam 5, and/or to detect and use Beam 4 as its receive beam (or otherwise determine that the base station 102 is using Beam 4 as the transmit beam).

In another example, in determining the transmit/receive beam pair at Block 310, optionally at Block 316, an indication of a different transmit/receive beam pair to use can be received and, based on the list, a new transmit/receive beam pair can be requested or it can be indicated to use the transmit/receive beam pair. In an aspect, beam determining component 256, e.g., in conjunction with processor(s) 212, memory 216, transceiver 202, backhaul component 242, etc., can receive the indication of the different transmit/receive beam pair to use and, based on the list, can request the new transmit/receive beam pair or can indicate to use the transmit/receive beam pair (e.g., the pair determined at Block 310). For example, the different node can indicate to use a beam pair that is not allowed, or is to be avoided, based on the generated list, as described above. In this case, beam determining component 256 can determine to request a new transmit/receive beam pair from the different node to avoid using the pair in the received indication. In another example, beam determining component 256 can indicate the transmit/receive beam pair to use to the different node, where the transmit/receive beam pair can be the pair (or one of multiple pairs) determined at Block 310 (e.g., as being not in the list where the list includes pairs to be avoided, as being in the list where the list includes pairs to be used, as having a low interference indicated in the list, etc., as described above).

For example, this can be a cooperative or interactive approach performed with the different node. In an example, this approach may generally be used or may be used alternatively (or in addition to) using the nullforming beam described above. In one example, beam determining component 256 can request or indicate the transmit/receive beam pair where a nullforming beam weight may not be possible for a specific choice of intended signal direction and null direction (e.g., for large array size, constraints on phase shifter and antenna gain control (AGC) quantization, calibration errors, how close the intended and null directions are, circuit level architecture, etc.). In these scenarios, beam determining component 256 can decline the request from the different node and can seek a better choice of beam index for transmission and/or reception from the different node, as described.

In another example, in method 300, optionally at Block 318, at least a portion of information from the list can be indicated to a different node. In an aspect, beam determining component 256, e.g., in conjunction with processor(s) 212, memory 216, transceiver 202, backhaul component 242, etc., can indicate, to the different node (e.g., over a backhaul link), at least the portion of information from the list. For example, beam determining component 256 can indicate the portion of the information from the list, which can include a list of beam pairs to use with the base station 102 (or to be avoided in communicating with the base station 102).

In this example, in determining the transmit/receive beam pair at Block 310, optionally at Block 320, an indication to use the transmit/receive beam pair can be received based at least in part on indicating at least a portion of information from the list. In an aspect, beam determining component 256, e.g., in conjunction with processor(s) 212, memory 216, transceiver 202, backhaul component 242, etc., can receive, based at least in part on indicating at least the portion of information from the list, the indication to use the transmit/receive beam pair. In this regard, the different node can configure the beam pair for the base station 102 based on receiving the information such that beams determined as not to be avoided can be used in communicating with the base station 102. In one example, the different node can be configured similarly to base station 102, and thus can also determine the transmit/beam pair for base station 102 to avoid interference with itself.

Thus, for example, in method 300, optionally at Block 322, information regarding transmit/receive beam pairs to use or not to use can be received from a different node. In an aspect, beam determining component 256, e.g., in conjunction with processor(s) 212, memory 216, transceiver 202, backhaul component 242, etc., can receive, from the different node, the information regarding transmit/receive beam pairs to use or not to use. For example, beam determining component 256 can determine the transmit/receive beam pair to use based on the information received from the different node (e.g., to avoid pairs indicated in the information from the different node as to be avoided, to use pairs indicated in the information from the different node to be used) and also based on the information from the list generated at Block 306, as described.

This example can also be a cooperative/interactive approach between the base station 102 and the different node. For example, the base station 102 can perform a two-way beam training to train (or train with) the different node (e.g., node 400 can train Node 2, in the examples described above), where training can include training the Tx path at base station 102 and a Tx path at the different node. The different node can determine best or acceptable beam pairs on Rx path and can convey information regarding the beam pairs to base station 102 Tx path. Base station 102 can determine best or acceptable beam pairs on Rx path and can convey info to the different node Tx path. However, as previously described, there may be no consensus in beam pairs for both links, and/or some choices of beam pairs for one link may degrade the other link due to self-interference. Beam pair adaptation on both the links via an iterative approach may be possible as well. In this example, as described in reference to Block 318, base station 102 can send the additional information to the different node, which can include indications or information that captures the clutter around it (e.g., directions and interference level caused by different clutter). The different node can compare this information with its own list to determine a beam pair, that is determined to not be avoided, for both nodes. Since both nodes can have similar capabilities (e.g., FD in an integrated access and backhaul (IAB) configuration), both nodes can act as a "master node" to forward the appropriate information to the other node.

In another example, in method 300, optionally at Block 324, beam training can be performed based on the list. In an aspect, beamforming component 252, e.g., in conjunction with processor(s) 212, memory 216, transceiver 202, backhaul component 242, etc., can perform beam training based on the list. In this example, Blocks 302, 304, 306, and 310 can be performed in self-training to determine the beam pairs to be avoided or to be used, as described, and then can perform beam training based on the list. In this regard, for example, beam training component 252 can optimize beam training by avoiding transmitting transmit beams in the list at least for a receive beam opportunity where the receive beam is part of the transmit/receive beam pair, etc. For example, in beam training, Tx part and Rx part of each node can perform self-training alone (e.g., via periodic, dedicated resources allocated for self-training) where no beam training is done for (or with) other FD nodes. Where the Tx part and Rx part of the base station 102 are geographically co-located in the base node, self-training can be done with low power (and hence with a more tolerable interference footprint) and over symbols where the base station 102 is inactive/has no data to send/receive. After identifying the set of allowed and disallowed beams at base station 102, beamforming component 252 can prune its codebook of beams of the disallowed beams for subsequent beam training to other FD nodes.

In another example, in method 300, optionally at Block 326, a capability to generate nullforming beams in one or more beam directions can be indicated to a different node. In an aspect, beam determining component 256, e.g., in conjunction with processor(s) 212, memory 216, transceiver 202, backhaul component 242, etc., can indicate, to the different node, the capability to generate nullforming beams in the one or more directions. In this example, determining the transmit/receive beam pair at Block 310 may include receiving an indication, from the different node, of a beam pair to use based on the ability to generate nullforming beams. In this example, the different node may select the beam pair based on the indicated ability of base station 102 to nullform beams in certain directions and/or may indicate that the base station 102 is to nullform beams in a certain direction. For example, beam determining component 256 can indicate, to the different node, a capability to generate nullforming beams in one or more directions or to generate beams with specified null properties in one or more directions relative to directions with good signal energy, and the different node can accordingly configure base station 102 to generate nullformed beams.

Figure 5:
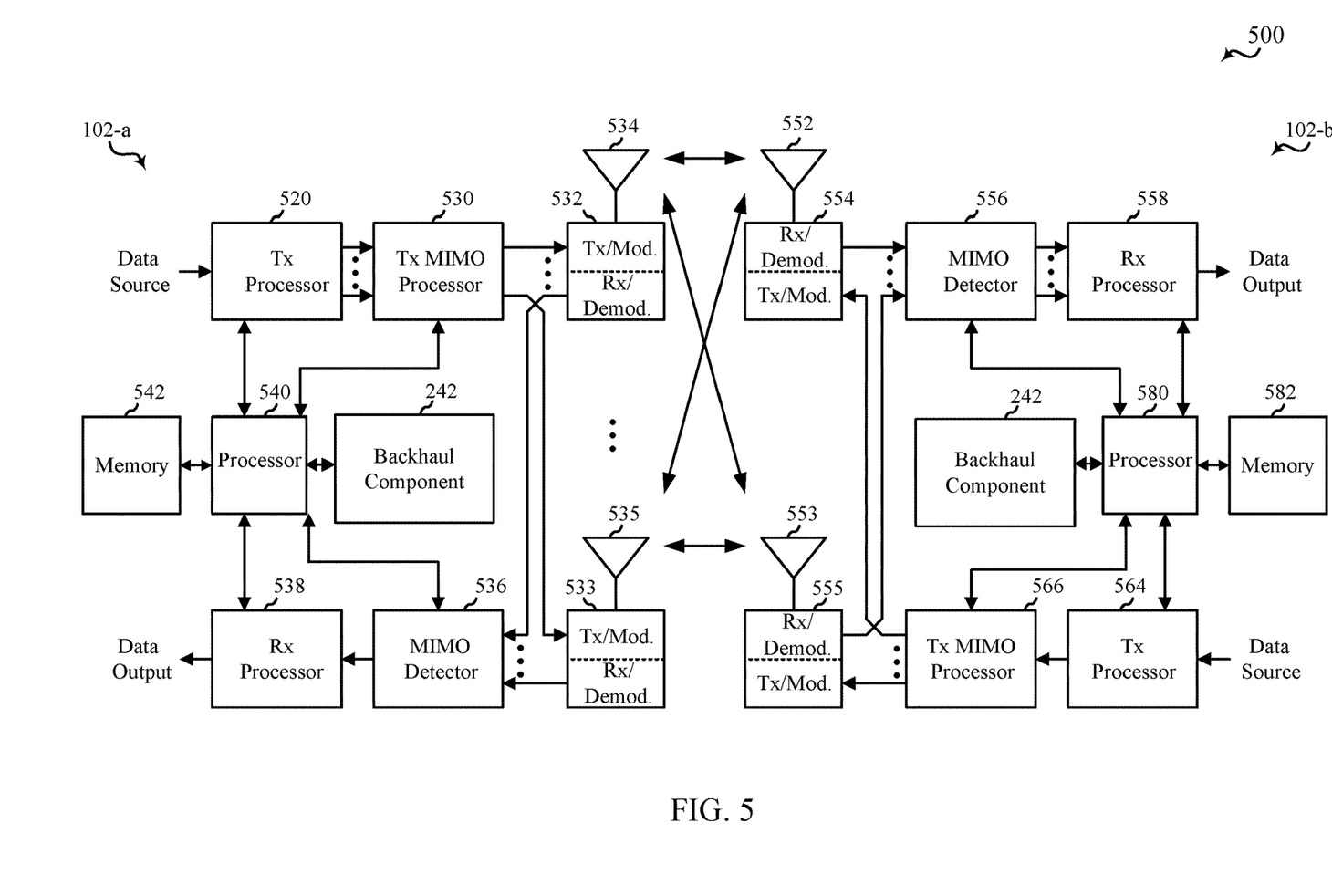
FIG. 5 is a block diagram illustrating an example of a MIMO communication system including base stations in backhaul communications, in accordance with various aspects of the present disclosure.

FIG. 5 is a block diagram of a MIMO communication system 500 including base stations 102-a and 102-b that can communicate over a wireless backhaul, in accordance with various aspects of the present disclosure. The MIMO communication system 500 may illustrate aspects of the wireless communication access network 100 described with reference to FIG. 1. The base stations 102-a, 102-b may be an example of aspects of the base station 102 described with reference to FIG. 1. The base station 102-a may be equipped with antennas 534 and 535, and the base station 102-b may be equipped with antennas 552 and 553. In the MIMO communication system 500, the base station 102-a may be able to send data over multiple communication links at the same time. Each communication link may be called a "layer" and the "rank" of the communication link may indicate the number of layers used for communication. For example, in a 2×2 MIMO communication system where base station 102-a transmits two "layers," the rank of the backhaul link between the base station 102-a and the base station 102-b is two.

At the base station 102-a, a transmit (Tx) processor 520 may receive data from a data source. The transmit processor 520 may process the data. The transmit processor 520 may also generate control symbols or reference symbols. A transmit MIMO processor 530 may perform spatial processing (e.g., precoding) on data symbols, control symbols, or reference symbols, if applicable, and may provide output symbol streams to the transmit modulator/demodulators 532 and 533. Each modulator/demodulator 532 through 533 may process a respective output symbol stream (e.g., for OFDM, etc.) to obtain an output sample stream. Each modulator/demodulator 532 through 533 may further process (e.g., convert to analog, amplify, filter, and upconvert) the output sample stream to obtain a DL signal. In one example, DL signals from modulator/demodulators 532 and 533 may be transmitted via the antennas 534 and 535, respectively.

The base station 102-b may be an example of aspects of the base station 102 (or other upstream nodes) described with reference to FIGS. 1-2. At the base station 102-b, the antennas 552 and 553 may receive the DL signals from the base station 102-a and may provide the received signals to the modulator/demodulators 554 and 555, respectively. Each modulator/demodulator 554 through 555 may condition (e.g., filter, amplify, downconvert, and digitize) a respective received signal to obtain input samples. Each modulator/demodulator 554 through 555 may further process the input samples (e.g., for OFDM, etc.) to obtain received symbols.

A MIMO detector 556 may obtain received symbols from the modulator/demodulators 554 and 555, perform MIMO detection on the received symbols, if applicable, and provide detected symbols. A receive (Rx) processor 558 may process (e.g., demodulate, deinterleave, and decode) the detected symbols, providing decoded data for the UE 104 to a data output, and provide decoded control information to a processor 580, or memory 582.

The processor 580 may in some cases execute stored instructions to instantiate a backhaul component 242 (see e.g., FIGS. 1 and 2).

On the uplink (UL), at the base station 102-b, a transmit processor 564 may receive and process data from a data source. The transmit processor 564 may also generate reference symbols for a reference signal. The symbols from the transmit processor 564 may be precoded by a transmit MIMO processor 566 if applicable, further processed by the modulator/demodulators 554 and 555 (e.g., for SC-FDMA, etc.), and be transmitted to the base station 102-a in accordance with the communication parameters received from the base station 102-a. At the base station 102-a, the UL signals from the base station 102-b may be received by the antennas 534 and 535, processed by the modulator/demodulators 532 and 533, detected by a MIMO detector 536 if applicable, and further processed by a receive processor 538. The receive processor 538 may provide decoded data to a data output and to the processor 540 or memory 542.

The processor 540 may in some cases execute stored instructions to instantiate a backhaul component 242 (see e.g., FIGS. 1 and 3).

The components of the base station 102-b may, individually or collectively, be implemented with one or more application-specific integrated circuits (ASICs) adapted to perform some or all of the applicable functions in hardware. Each of the noted modules may be a means for performing one or more functions related to operation of the MIMO communication system 500. Similarly, the components of the base station 102-a may, individually or collectively, be implemented with one or more ASICs adapted to perform some or all of the applicable functions in hardware. Each of the noted components may be a means for performing one or more functions related to operation of the MIMO communication system 500.

In addition, the base station 102-a and/or 102-b may communicate with downstream nodes, which may include one or more UEs 104 or other base stations, using similar mechanisms as described for base station 102-a and base station 102-b, respectively (e.g., where the downstream node can use components and functions described above with respect to base station 102-b, and base station 102-a or base station 102-b as an upstream node can use components and functions described above with respect to base station 102-a).

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The following aspects are illustrative only and aspects thereof may be combined with aspects of other embodiments or teaching described herein, without limitation.

Aspect 1 is a method for wireless communication by a node including measuring a signal quality at at least one receive beam while transmitting, in full duplex communications, over each of one or more transmit beams associated with the at least one receive beam, and determining, based at least in part on the measured signal quality associated with each of the one or more transmit beams and the at least one receive beam, a transmit/receive beam pair to use in full duplex communications with one or more other nodes.

In Aspect 2, the method of Aspect 1 includes determining, for the node, a number of transmit beams, including the one or more transmit beams, and a number of receive beams, including the at least one receive beam.

In Aspect 3, the method of Aspect 2 includes, for each receive beam in the number of receive beams, transmitting the number of transmit beams.

In Aspect 4, the method of Aspect 3 includes wherein measuring the signal quality is part of generating a list of transmit/receive beam pairs by, for each transmit beam in the number of transmit beams for a given receive beam, measuring the signal quality at the given receive beam while transmitting the transmit beam in full duplex communications, and wherein determining the transmit/receive beam pair to use is based at least in part on the list.

In Aspect 5, the method of Aspect 4 includes wherein generating the list of transmit/receive beam pairs includes indicating by the list, for each given transmit/receive beam pair, whether the given transmit/receive beam pair is to be avoided or is not to be avoided based on comparing the signal quality to a threshold.

In Aspect 6, the method of Aspect 5 includes wherein determining the transmit/receive beam pair to use is based on determining that the transmit/receive beam pair is not to be avoided.

In Aspect 7, the method of any of Aspects 1 to 6 include wherein the signal quality includes at least one of a signal-to-noise ratio (SNR) or a signal-to-noise-plus-interference ratio (SINR).

In Aspect 8, the method of any of Aspects 1 to 7 include wherein the measured signal quality includes a measure of self-interference caused by a corresponding transmit beam of the one or more transmit beams at the at least one receive beam.

In Aspect 9, the method of any of Aspects 1 to 8 include receiving, from a different node of the one or more other nodes, an indication of a configured transmit/receive beam pair to use in communicating with the one or more other nodes, wherein determining the transmit/receive beam pair to use comprises replacing, based on the signal quality, at least a transmit beam of the configured transmit/receive beam pair with a nullforming beam that steers energy away from at least the receive beam of the configured transmit/receive beam pair.

In Aspect 10, the method of any of Aspects 1 to 9 include receiving, from a different node of the one or more other nodes, an indication of a different transmit/receive beam pair to use in communicating with the one or more other nodes, and indicating, to the different node of the one or more other nodes, based on the measured signal quality associated with the different transmit/receive beam pair, not to use the different transmit/receive beam pair.

In Aspect 11, the method of Aspect 10 includes wherein indicating not to use the different transmit/receive beam pair comprises at least one of requesting a new transmit/receive beam pair or indicating to use the transmit/receive beam pair determined based at least in part on the list of transmit/receive beam pairs.

In Aspect 12, the method of any of Aspects 1 to 11 include indicating, to a different node of the one or more other nodes, at least a portion of information from a list of transmit/receive beam pairs including indications of whether each of the transmit/receive beam pairs are to be avoided or not to be avoided, and receiving, from the different node and based on at least the portion of information, an indication to use the transmit/receive beam pair in communicating with the one or more other nodes.

In Aspect 13, the method of any of Aspects 1 to 12 include receiving, from a different node of the one or more other nodes, information regarding transmit/receive beam pairs to be avoided or not to be avoided at the different node, wherein determining the transmit/receive beam pair to use is additionally based on the information, and transmitting, to the different node, an indication to use the transmit/receive beam pair in communicating with the node.

In Aspect 14, the method of any of Aspects 1 to 13 include performing beam training with the one or more other nodes based on a portion of transmit/receive beam pairs selected from a list of transmit/receive beam pairs including indications of whether each of the transmit/receive beam pairs are to be avoided or not to be avoided, wherein determining the transmit/receive beam pair to use is based on results of the beam training.

In Aspect 15, the method of any of Aspects 1 to 14 include indicating, to a different node of the one or more other nodes, a capability to generate nullforming beams in one or more directions or to generate beams with specified null properties in one or more directions relative to directions with desirable signal energy, and receiving, from the different node and based on the capability, an indication to use the transmit/receive beam pair in communicating with the one or more other nodes.

Aspect 16 is an apparatus for wireless communication including a transceiver, a memory configured to store instructions, and one or more processors communicatively coupled with the transceiver and the memory, wherein the one or more processors are configured to execute the instructions to perform the operations of one or more methods in any of Aspects 1 to 15.

Aspect 17 is an apparatus for wireless communication including means for performing the operations of one or more methods in any of Aspects 1 to 15.

Aspect 18 is a computer-readable medium including code executable by one or more processors to perform the operations of one or more methods in any of Aspects 1 to 15.

What is claimed is:

1. A method for wireless communication by a node, the method comprising:
   receiving an indication of a configured transmit/receive beam pair to use by the node in full duplex communications with one or more other nodes;
   measuring a signal quality of at least one receive beam while transmitting, in full duplex communications, over each of one or more transmit beams associated with the at least one receive beam; and
   determining, based at least in part on the measured signal quality of the at least one receive beam, a transmit/receive beam pair to use by the node in the full duplex communications with the one or more other nodes, wherein determining the transmit/receive beam pair to use by the node includes, where the configured transmit/receive beam pair is determined to be avoided, replacing, based on the measured signal quality, a transmit beam of the configured transmit/receive beam pair with a nullforming transmit beam that steers energy in a direction of the transmit beam of the configured transmit/receive beam pair and away from the receive beam of the configured transmit/receive beam pair.

2. The method of claim 1, further comprising determining, for the node, a number of transmit beams, including the one or more transmit beams, and a number of receive beams, including the at least one receive beam.

3. The method of claim 2, further comprising, for each receive beam in the number of receive beams, transmitting the number of transmit beams.

4. The method of claim 3, wherein measuring the signal quality includes, for each transmit beam in the number of transmit beams and for a given receive beam, measuring the signal quality at the given receive beam while transmitting the transmit beam in full duplex communications, and further comprising generating a list of transmit/receive beam pairs based on the signal quality for each transmit beam and the given receive beam, wherein the configured transmit/receive beam pair determined to be avoided is determined to be avoided based at least in part on the list.

5. The method of claim 4, wherein generating the list of transmit/receive beam pairs includes indicating by the list, for each given transmit/receive beam pair, whether the given transmit/receive beam pair is to be avoided or is not to be avoided based on comparing the signal quality to a threshold.

6. The method of claim 5, wherein determining the transmit/receive beam pair to use by the node is based on determining that the transmit/receive beam pair is not to be avoided.

7. The method of claim 1, wherein the signal quality includes at least one of a signal-to-noise ratio (SNR) or a signal-to-interference-plus-noise ratio (SINR).

8. The method of claim 1, wherein the signal quality includes a measure of self-interference caused by a corresponding transmit beam of the one or more transmit beams at the at least one receive beam.

9. The method of claim 1, further comprising:
receiving, from a different node of the one or more other nodes, an indication of a different transmit/receive beam pair to use in communicating with the one or more other nodes; and
indicating, to the different node of the one or more other nodes, based on the measured signal quality associated with the different transmit/receive beam pair, not to use the different transmit/receive beam pair.

10. The method of claim 9, wherein indicating not to use the different transmit/receive beam pair comprises at least one of requesting a new transmit/receive beam pair or indicating to use the transmit/receive beam pair determined based at least in part on a list of transmit/receive beam pairs.

11. The method of claim 1, further comprising:
indicating, to a different node of the one or more other nodes, at least a portion of information from a list of transmit/receive beam pairs including indications of whether each of the transmit/receive beam pairs are to be avoided or not to be avoided; and
receiving, from the different node and based on at least the portion of information, an indication to use a new transmit/receive beam pair in communicating with the one or more other nodes.

12. The method of claim 1, further comprising:
receiving, from a different node of the one or more other nodes, information regarding transmit/receive beam pairs to be avoided or not to be avoided at the different node, wherein determining the transmit/receive beam pair to use by the node is additionally based on the information; and
transmitting, to the different node, an indication to use the determined transmit/receive beam pair in communicating with the node.

13. The method of claim 1, further comprising:
indicating, to a different node of the one or more other nodes, a capability to generate nullforming beams in one or more directions or to generate beams with specified null properties in one or more directions relative to directions with desirable signal energy; and
receiving, from the different node and based on the capability, an indication to use the transmit/receive beam pair in communicating with the one or more other nodes.

14. The method of claim 1, wherein the node or the one or more other nodes include at least one of an integrated access and backhaul (IAB) node, a user equipment (UE), a customer premises equipment (CPE), an access point, a relay node, or a repeater.

15. An apparatus for wireless communication, comprising:
a transceiver;
a memory configured to store instructions; and
one or more processors communicatively coupled with the transceiver and the memory, wherein the one or more processors are configured to:
receive an indication of a configured transmit/receive beam pair to use by the apparatus in full duplex communications with one or more other nodes;
measure a signal quality of at least one receive beam while transmitting, in full duplex communications, over each of one or more transmit beams associated with the at least one receive beam; and
determine, based at least in part on the measured signal quality of the at least one receive beam, a transmit/receive beam pair to use by the apparatus in the full duplex communications with the one or more other nodes, wherein the one or more processors are configured to determine the transmit/receive beam pair to use by the apparatus at least in part by, where the configured transmit/receive beam pair is determined to be avoided, replacing, based on the measured signal quality, a transmit beam of the configured transmit/receive beam pair with a nullforming transmit beam that steers energy in a direction of the transmit beam of the configured transmit/receive beam pair and away from the receive beam of the configured transmit/receive beam pair.

16. The apparatus of claim 15, wherein the one or more processors are further configured to determine, for the node, a number of transmit beams, including the one or more transmit beams, and a number of receive beams, including the at least one receive beam.

17. The apparatus of claim 16, wherein the one or more processors are further configured to, for each receive beam in the number of receive beams, transmit the number of transmit beams.

18. The apparatus of claim 17, wherein the one or more processors are configured to measure the signal quality by, for each transmit beam in the number of transmit beams and for a given receive beam, measuring the signal quality at the given receive beam while transmitting the transmit beam in full duplex communications, and wherein the one or more processors are further configured to generate a list of transmit/receive beam pairs based on the signal quality for each transmit beam and the given receive beam, wherein the one or more processors are configured to configure the transmit/receive beam pair determined to be avoided based at least in part on the list.

19. The apparatus of claim 18, wherein the one or more processors are configured to generate the list of transmit/receive beam pairs by indicating by the list, for each given transmit/receive beam pair, whether the given transmit/receive beam pair is to be avoided or is not to be avoided based on comparing the signal quality to a threshold.

20. The apparatus of claim 19, wherein the one or more processors are configured to determine the transmit/receive beam pair to use by the apparatus based on determining that the transmit/receive beam pair is not to be avoided.

21. The apparatus of claim 15, wherein the signal quality includes at least one of a signal-to-noise ratio (SNR) or a signal-to-interference-plus-noise ratio (SINR).

22. The apparatus of claim 15, wherein the signal quality includes a measure of self-interference caused by a corresponding transmit beam of the one or more transmit beams at the at least one receive beam.

23. The apparatus of claim 15, wherein the one or more processors are further configured to:
receive, from a different node of the one or more other nodes, an indication of a different transmit/receive beam pair to use in communicating with the one or more other nodes; and
indicate, to the different node of the one or more other nodes, based on the measured signal quality associated with the different transmit/receive beam pair, not to use the different transmit/receive beam pair.

24. The apparatus of claim 15, wherein the one or more processors are further configured to:
indicate, to a different node of the one or more other nodes, at least a portion of information from a list of transmit/receive beam pairs including indications of whether each of the transmit/receive beam pairs are to be avoided or not to be avoided; and receive, from the different node and based on at least the portion of information, an indication to use a new transmit/receive beam pair in communicating with the one or more other nodes.

25. The apparatus of claim 15, wherein the one or more processors are further configured to:

receive, from a different node of the one or more other nodes, information regarding transmit/receive beam pairs to be avoided or not to be avoided at the different node, wherein determining the transmit/receive beam pair to use by the node is additionally based on the information; and transmit, to the different node, an indication to use the determined transmit/receive beam pair in communicating with the node.

26. The apparatus of claim 15, wherein the one or more processors are further configured to:

indicate, to a different node of the one or more other nodes, a capability to generate nullforming beams in one or more directions or to generate beams with specified null properties in one or more directions relative to directions with desirable signal energy; and receive, from the different node and based on the capability, an indication to use the transmit/receive beam pair in communicating with the one or more other nodes.

27. An apparatus for wireless communication, comprising:

means for receiving an indication of a configured transmit/receive beam pair to use by the apparatus in full duplex communications with one or more other nodes;

means for measuring a signal quality of at least one receive beam while transmitting, in full duplex communications, over each of one or more transmit beams associated with the at least one receive beam; and means for determining, based at least in part on the measured signal quality of the at least one receive beam, a transmit/receive beam pair to use by the apparatus in the full duplex communications with the one or more other nodes, wherein the means for determining determines the transmit/receive beam pair to use by the apparatus at least in part by, where the configured transmit/receive beam pair is determined to be avoided, replacing, based on the measured signal quality, a transmit beam of the configured transmit/receive beam pair with a nullforming transmit beam that steers energy in a direction of the transmit beam of the configured transmit/receive beam pair and away from the receive beam of the configured transmit/receive beam pair.

28. The apparatus of claim 27, further comprising means for determining, for the node, a number of transmit beams, including the one or more transmit beams, and a number of receive beams, including the at least one receive beam.

29. A non-transitory computer-readable medium, comprising code executable by one or more processors for wireless communication at a node, the code comprising code for:

receiving an indication of a configured transmit/receive beam pair to use by the node in full duplex communications with one or more other nodes;

measuring a signal quality of at least one receive beam while transmitting, in full duplex communications, over each of one or more transmit beams associated with the at least one receive beam; and determining, based at least in part on the measured signal quality of the at least one receive beam, a transmit/receive beam pair to use by the node in the full duplex communications with the one or more other nodes, wherein the code for determining determines the transmit/receive beam pair to use by the node at least in part by, where the configured transmit/receive beam pair is determined to be avoided, replacing, based on the measured signal quality, a transmit beam of the configured transmit/receive beam pair with a nullforming transmit beam that steers energy in a direction of the transmit beam of the configured transmit/receive beam pair and away from the receive beam of the configured transmit/receive beam pair.

30. The non-transitory computer-readable medium of claim 29, further comprising code for determining, for the node, a number of transmit beams, including the one or more transmit beams, and a number of receive beams, including the at least one receive beam.

* * * * *